US010692382B2

(12) United States Patent
Urhahne et al.

(10) Patent No.: US 10,692,382 B2
(45) Date of Patent: Jun. 23, 2020

(54) METHOD AND DEVICE FOR ASSISTING A PARKING MANEUVER

(71) Applicant: FORD GLOBAL TECHNOLOGIES, LLC, Dearborn, MI (US)

(72) Inventors: Joseph Andreas Urhahne, Pulheim (DE); Robert Spahl, Cologne (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 88 days.

(21) Appl. No.: 15/484,717

(22) Filed: Apr. 11, 2017

(65) Prior Publication Data

US 2017/0301241 A1 Oct. 19, 2017

(30) Foreign Application Priority Data

Apr. 13, 2016 (DE) .................. 10 2016 206 123

(51) Int. Cl.
*G08G 1/16* (2006.01)
*G05D 1/00* (2006.01)
(Continued)

(52) U.S. Cl.
CPC ............. *G08G 1/168* (2013.01); *B60K 35/00* (2013.01); *B60K 37/06* (2013.01); *B60Q 1/48* (2013.01); *B60Q 5/005* (2013.01); *B60W 30/06* (2013.01); *B62D 15/0285* (2013.01); *G05D 1/005* (2013.01); *G05D 1/0016* (2013.01); *G05D 1/0022* (2013.01); *B60K 2370/157* (2019.05); *B60K 2370/179* (2019.05);
(Continued)

(58) Field of Classification Search
CPC .... G08G 1/168; G05D 1/0016; G05D 1/0033; G05D 1/005
See application file for complete search history.

(56) References Cited

U.S. PATENT DOCUMENTS 8,810,434 B2 * 8/2014 Groult ................ E04H 6/426
340/932.2
9,466,217 B2 * 10/2016 Bonhoure ............. B60K 35/00
(Continued)

FOREIGN PATENT DOCUMENTS

DE 102008051982 A1 6/2009
DE 102008019461 A1 10/2009
(Continued)

OTHER PUBLICATIONS

German Search Report dated Mar. 29, 2017 for German Application No. 102016206123.2, 8 pgs.

*Primary Examiner* — Todd M Melton
(74) *Attorney, Agent, or Firm* — Frank Lollo; Brooks Kushman PC

(57) ABSTRACT

Methods and devices assist in a parking maneuver of a vehicle. The vehicle includes a parking aid that produces a first signal. The first signal is perceptible in an interior of the vehicle during a parking maneuver. A signal property of the first signal is adapted to a currently prevailing distance of the vehicle from a parking obstruction. The first signal is converted into a second signal that is perceptible by an operator located outside the vehicle. The second signal is transmitted to the operator disposed outside the vehicle during a remotely-controlled performance of the parking maneuver.

20 Claims, 2 Drawing Sheets

(51) Int. Cl.
    *B62D 15/02*     (2006.01)
    *B60K 35/00*     (2006.01)
    *B60W 30/06*     (2006.01)
    *B60K 37/06*     (2006.01)
    *B60Q 5/00*     (2006.01)
    *B60Q 1/48*     (2006.01)

(52) U.S. Cl.
    CPC ...... *B60K 2370/48* (2019.05); *B60K 2370/55* (2019.05); *B60K 2370/797* (2019.05)

(56) References Cited

U.S. PATENT DOCUMENTS

| | | | |
|---|---|---|---|
| 9,734,686 B2 * | 8/2017 | Grenn | G08B 21/02 |
| 9,789,904 B2 * | 10/2017 | Jecker | B62D 15/025 |
| 9,792,785 B2 * | 10/2017 | Rittger | B60Q 9/006 |
| 9,946,255 B2 * | 4/2018 | Matters | B62D 15/027 |
| 2014/0180567 A1 * | 6/2014 | Fetsch | G08G 1/167 |
| | | | 701/301 |
| 2014/0203925 A1 | 7/2014 | Augst | |
| 2014/0222252 A1 | 8/2014 | Matters et al. | |
| 2015/0088360 A1 | 3/2015 | Bonnet et al. | |
| 2015/0127208 A1 | 5/2015 | Jecker et al. | |
| 2015/0149022 A1 | 5/2015 | Harvey | |
| 2017/0129537 A1 * | 5/2017 | Kim | B62D 15/0285 |

FOREIGN PATENT DOCUMENTS

| | | | |
|---|---|---|---|
| DE | 102008033925 A1 | 1/2010 | |
| DE | 102012008858 A1 | 1/2010 | |
| DE | 102012007984 A1 | 3/2013 | |
| DE | 102011084366 A1 | 4/2013 | |
| DE | 102013213064 A1 | 1/2015 | |
| DE | 102014205122 A1 | 9/2015 | |
| DE | 102016201813 B3 | 3/2017 | |
| EP | 2617627 A2 | 7/2013 | |
| EP | 2821807 A2 | 1/2015 | |
| JP | 2006048091 A | 2/2006 | |
| WO | WO-2016166086 A1 * | 10/2016 | G06K 9/00812 |

\* cited by examiner

METHOD AND DEVICE FOR ASSISTING A PARKING MANEUVER

CROSS-REFERENCE TO RELATED APPLICATIONS

This application claims foreign priority benefits under 35 U.S.C. § 119(a)-(d) to DE Application 10 2016 206 123.2 filed Apr. 13, 2016, which is hereby incorporated by reference in its entirety.

TECHNICAL FIELD

The disclosure concerns a method and a device for assisting a parking maneuver.

BACKGROUND

Devices for remotely controlled parking are primarily offered in vehicles of the luxury class. The background to this is, inter alia, that to implement fully remotely controlled parking processes, adequate fitting of the respective vehicle with highly developed sensors is necessary, even including ultrasound, laser, radar and video technologies.

However, in practice the functionality of remote control parking is also desirable in vehicles of the medium class as well as in vehicles or small cars designed for urban traffic. Because the percentage of vehicles with high quality sensor technologies is rather low in certain vehicle classes, there is a need for cost-effective solutions in order to also implement the functionality of remote control parking in such vehicles.

Inter alia, a system and a method for the remote control of a vehicle are known from EP 2 617 627 A2, wherein the vehicle comprises a transceiver that exchanges signals with a remote-control device. The system is designed to analyze signals of acceleration sensors and/or position sensors of the remote-control device, and to control vehicle movements according to the signals. Furthermore, a "deadman button" function can be provided in the remote controller, with which the user holds a button depressed and/or must repeatedly operate the button in order to enable the remotely controlled movement of the vehicle.

Inter alia, a method for carrying out an autonomous parking process of a motor vehicle is known from DE 10 2012 008 858 A1, wherein there is a communications connection between an operator located outside of the motor vehicle and the motor vehicle, by which at least one command for activating the autonomous parking process of the motor vehicle can be transmitted. During this, the signaling of a variation of the surroundings of the motor vehicle since the autonomous movement into the target position, for example a newly parked vehicle in the surroundings of the motor vehicle, can be carried out, for example by operating the horn and/or by operating the hazard warning system. Furthermore, the movement of the motor vehicle during the autonomous parking process can be stopped once the operator sets a predetermined operator action on the communications device.

Inter alia, a method for determining a position of a device that is associated with a vehicle is known from EP 2 821 807 A2, wherein a plurality of ultrasonic signals is emitted in a predetermined time sequence from a plurality of different emitting positions on the vehicle and wherein the position of the device is determined depending on the received ultrasonic signals and the predetermined time sequence.

For further prior art, reference is made to DE 10 2011 084 366 A1 and US 2015/0149022 A1 by way of example.

SUMMARY

It is an object of the present disclosure to provide a method and a device for assisting a parking maneuver that enables implementation of the functionality of remote-control parking with very low technical complexity.

A method according to the disclosure for assisting a parking maneuver of a vehicle, wherein the vehicle comprises a parking aid (PDC) that produces a first signal during a parking maneuver that is perceivable in the interior of the vehicle, wherein a signal property of said first signal is adapted to the respective currently prevailing distance of the vehicle from a parking obstruction, comprises the following steps:

converting the first signal into a second signal that is perceptible by an operator located outside the vehicle; and transmitting said second signal to the operator located outside the vehicle during a remotely controlled performance of the parking maneuver.

The disclosure is based on the concept of implementing the functionality of remote control parking based on standard equipment such as a conventional parking aid (PDC="Park Distance Control"). In this case, parking distances are signaled as a standard feature by means of a signal perceptible in the interior of the vehicle, such as, for example, by means of an audible note, wherein a signal property, such as for example the frequency of the note, is also adapted to the respective prevailing current distance from an obstruction during the parking maneuver, such as for example a wall. In this case, it is easily clear to the respective driver if he should bring the vehicle to rest when approaching the final parking position.

According to the disclosure, said feedback signal of the parking aid (PDC) that is available as a standard feature is used and is converted into a signal that is perceptible in the region outside the vehicle where the relevant signal is used for carrying out a remotely controlled parking maneuver.

According to the disclosure, equipping the relevant vehicle with a remote controller and a parking aid is necessary, has the advantage that as a rule such devices are available with all current vehicles, so that an already existing infrastructure of the vehicle can be built on. Furthermore, the vehicle in which the present disclosure is implemented is preferably capable of performing a very slow automatic maneuver for remotely controlled parking using the drive train as well as the brake system (for example at a speed of 2 kilometers/hour).

According to one embodiment, the conversion of the first signal into the second signal is carried out so that a signal property of said second signal is adapted to the respective current prevailing distance of the vehicle from a parking obstruction.

According to one embodiment, the second signal is perceptible around the vehicle in the entire 360° angular range.

According to one embodiment, the conversion of the first signal into the second signal is carried out continuously during a remotely controlled performance of the parking maneuver.

According to one embodiment, the signal property of the first or second signal is the frequency of the relevant signal.

According to one embodiment, the second signal is transmitted by vehicle illumination that is visible around the vehicle in the entire 360° angular range.

According to one embodiment, the second signal is transmitted by an acoustic signal transmitter, in particular a vehicle horn.

According to one embodiment, the second signal is transmitted by a portable unit, in particular a key fob or a remote controller. In this case, the remote controller can be the remote controller that is used for the parking process.

According to one embodiment, the second signal is transmitted as a haptic signal.

According to one embodiment, an immediate vehicle halt is caused once the operator sets a predetermined operator action.

The disclosure further concerns a device for assisting a parking maneuver of a vehicle, wherein the vehicle comprises a parking aid (PDC), by means of which a first signal that is perceptible in the interior of the vehicle can be produced during a parking maneuver, wherein a signal property of said first signal is adapted to the respective currently prevailing distance of the vehicle from a parking obstruction, and wherein the device is configured to carry out a method with the features described above. Regarding the advantages and preferred embodiments of the device, refer to the above statements in connection with the method according to the disclosure.

The disclosure is described in detail below using exemplary embodiments with reference to the accompanying figures.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The disclosure concerns a method and a device for assisting a parking maneuver of a vehicle, wherein the vehicle comprises a parking aid (PDC) that produces a first signal that is perceptible in the interior of the vehicle during a parking maneuver, wherein a signal property of said first signal is adapted to the respective currently prevailing distance of the vehicle from a parking obstruction, wherein the method comprises the following steps: conversion of the first signal into a second signal that is perceptible by an operator 20 located outside the vehicle 10 and transmitting said second signal to the operator 20 disposed outside the vehicle 10 during a remotely controlled performance of the parking maneuver.

Figure 1:
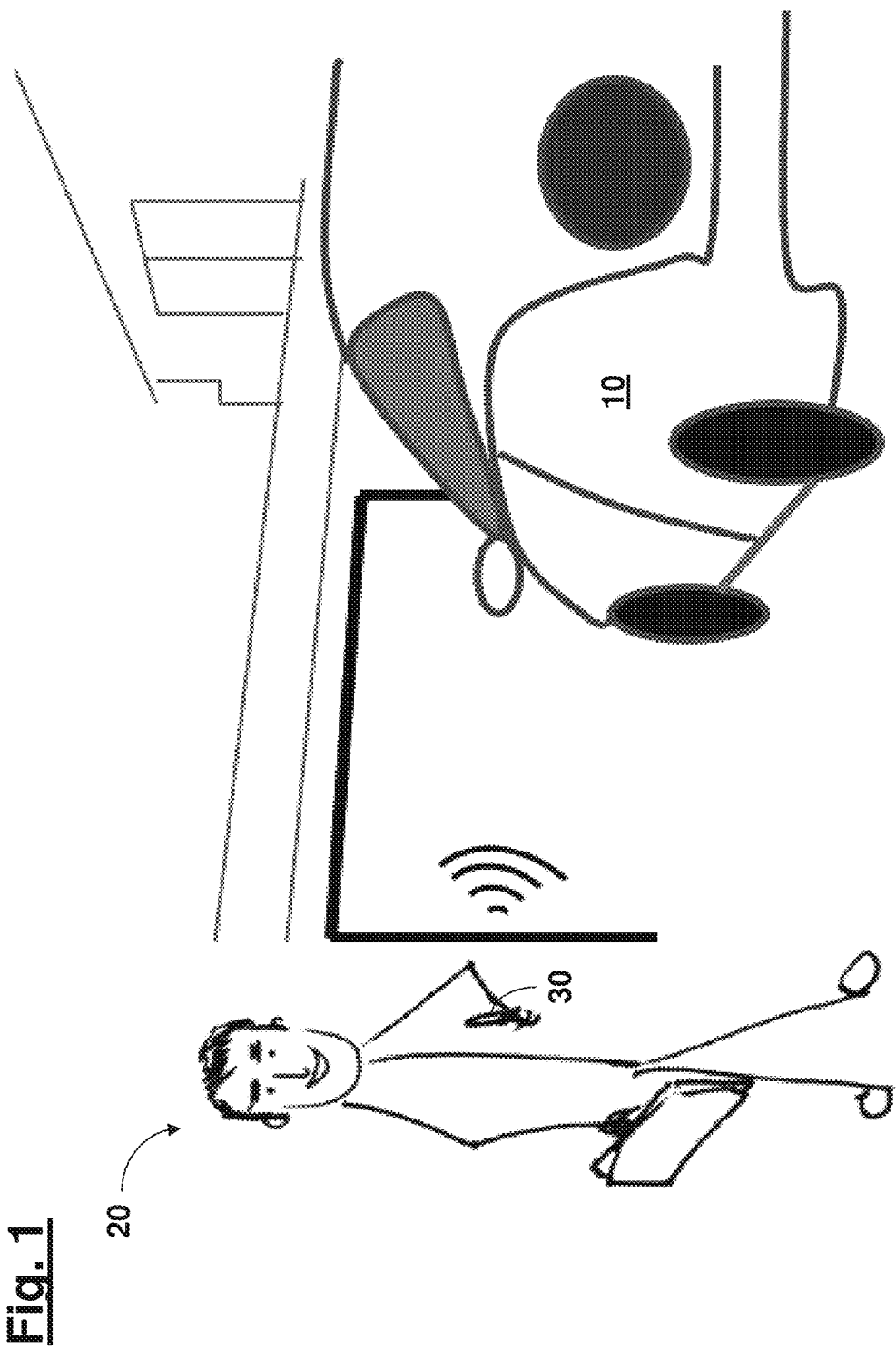
FIG. 1 shows a schematic sketch to illustrate a remotely controlled parking maneuver that is carried out according to the disclosure.

FIG. 1 schematically shows a vehicle 10 as well as an operator 20 located outside the vehicle 10 during remotely controlled performance of the parking maneuver, with a key fob 30 as the portable unit. The key fob 30 is used here as a remote controller for the parking maneuver. The vehicle 10 comprises a parking aid (PDC) that produces a signal that is perceptible in the interior of the vehicle 10 during a parking maneuver (for example an audible note in the interior of the vehicle 10), wherein a signal property (for example the frequency) of said signal is adapted to the respective currently prevailing distance of the vehicle 10 from a parking obstruction.

Because the operator 20 located outside the vehicle 10 in the aforementioned example cannot hear the note produced in the interior of the vehicle 10 by the parking aid (PDC) (referred to below as the "first signal" or feedback signal of the parking aid), a corresponding second signal is emitted in the region outside the vehicle 10, wherein this can be carried out in different ways:

an audible note, which can in particular comprise a signal shape that is dependent on or identical to the feedback signal of the parking aid (PDC), can be produced with the vehicle horn or by a signal note generator in the key fob 30.

a haptic signal with a signal shape dependent on or identical to the feedback signal of the parking aid (PDC) can be produced in a vibration element in the key fob 30.

a visible signal with a signal shape that is dependent on or identical to the feedback signal of the parking aid (PDC) and that is visible in the entire angular range of 360° can be produced by the vehicle illumination in the region around the entire vehicle 10.

a visible signal with a signal shape that is dependent on or identical to the feedback signal of the parking aid (PDC) can be provided by any externally visible element of the vehicle 10, for example on display screens that are visible in the entire angular range of 360° around the vehicle.

a visible signal with a signal shape that is dependent on, or identical, to the feedback signal of the parking aid (PDC) can be produced in the key fob 30 as a light signal.

Thus, in order to use the feedback signal of the parking aid to perform the remotely controlled parking maneuver, according to the disclosure, said feedback signal is converted into a second signal that is perceptible by the operator 20 that is located outside the vehicle 10, and the second signal is continuously transmitted to the operator 20 during the remotely controlled performance of the parking maneuver.

Figure 2:
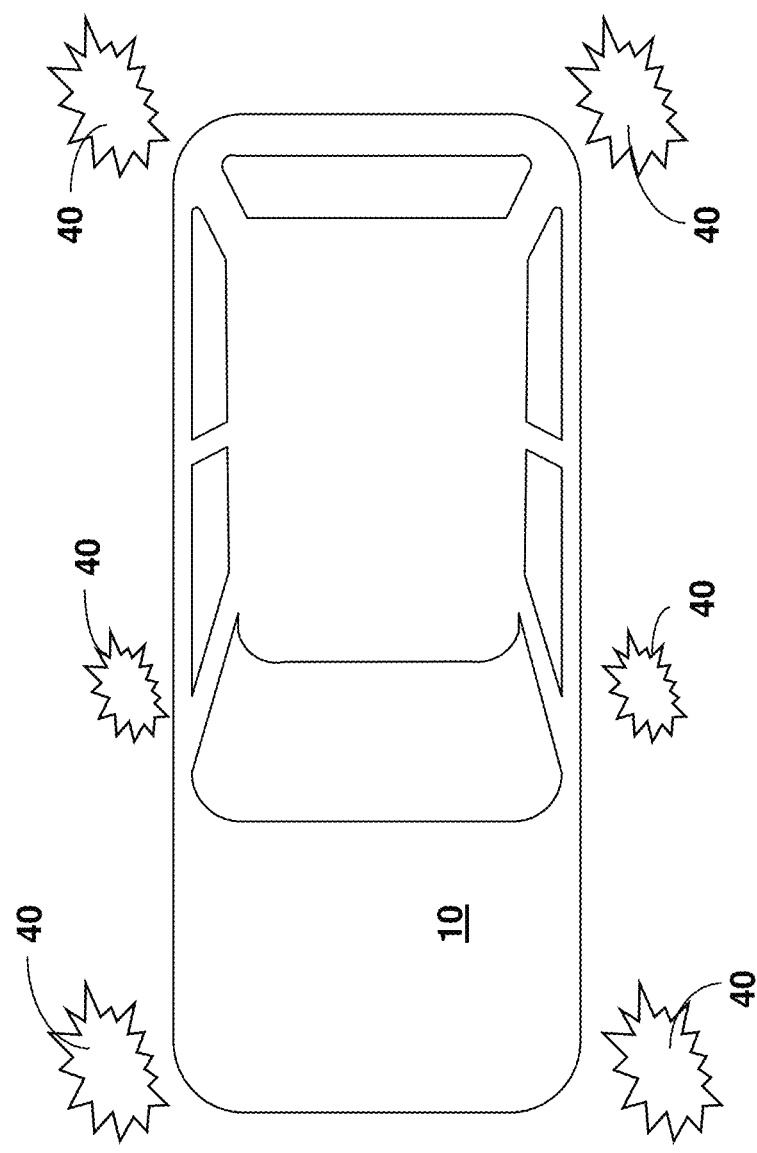
FIG. 2 shows schematic representations to describe possible embodiments of the disclosure.

In an embodiment of the disclosure that is schematically represented in FIG. 2, the vehicle 10 can be fitted with an illumination system that can emit a light signal 40 that is visible from all possible positions of the operator 20 around the vehicle 10 in the flashing mode or in the continuous mode.

Figure 3:
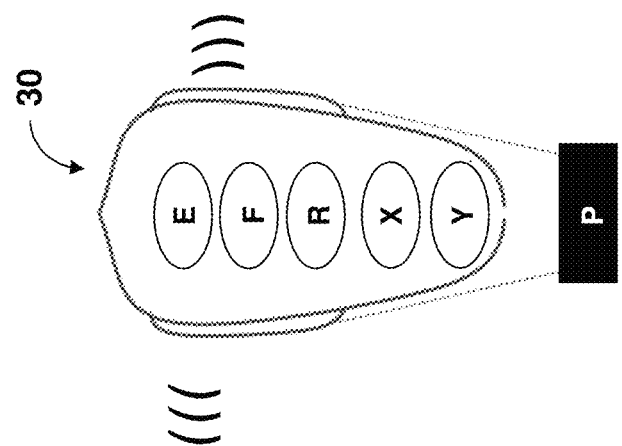
FIG. 3 shows a schematic representation to describe possible embodiments of the disclosure.

In a further embodiment that is schematically represented in FIG. 3, alternatively or additionally the portable unit held by the operator 20, i.e. the key fob 30 or a remote controller, can emit a visual or visible signal, an audible or acoustic signal and/or a vibration signal during the remotely controlled parking maneuver. In this case, as with the first signal of the parking aid (PDC), a signal property, such as for example the frequency of said second signal, can also be adapted to the respective currently prevailing distance of the vehicle 10 from a parking obstruction.

According to one embodiment, the device according to the disclosure (for example on the key fob 30 or the remote controller) is equipped with a "deadman button" function for parking. The operator 20 operates a button continuously for said function in order to start and maintain the parking maneuver of the vehicle 10. Once the operator 20 located outside the vehicle 10 releases the relevant button, an immediate stop of the vehicle 10 is carried out. Once the operator 20 detects a continuous signal waveform during the performance of the remotely controlled parking maneuver (which indicates an almost maximum proximity of the vehicle 10 to an obstacle), he can release the deadman switch, so that an immediate vehicle stop is caused.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A parking maneuver method for a vehicle having a parking aid that produces an acoustic signal within a vehicle interior having a signal property that varies according to vehicle distance from a parking obstruction, the method comprising:
    detecting the acoustic signal within the vehicle interior; and
    converting the acoustic signal into a second signal that is perceptible by an operator located outside the vehicle during a remotely-controlled parking maneuver.

2. The method as claimed in claim 1 further comprising varying a signal property of the second signal in response to the signal property that varies for the acoustic signal.

3. The method as claimed in claim 1, wherein the second signal comprises a visible signal perceptible around an entire 360° angular range of the vehicle.

4. The method as claimed in claim 1, wherein converting the acoustic signal into the second signal is carried out continuously during performance of the remotely-controlled parking maneuver.

5. The method as claimed in claim 1, wherein the signal property of the second signal is a frequency of the second signal.

6. The method as claimed in claim 1, wherein the second signal is transmitted by vehicle illumination that is visible in an entire 360° angular range around the vehicle.

7. The method as claimed in claim 1, wherein the second signal is transmitted by an acoustic signal transmitter.

8. The method as claimed in claim 1, wherein the second signal is transmitted by a portable unit.

9. The method as claimed in claim 1, wherein the second signal is transmitted as a haptic signal.

10. The method as claimed in claim 1 further comprising causing an immediate vehicle halt in response to a predetermined operator action.

11. A vehicle parking system comprising:
    a controller configured to, in response to a first signal, perceptible in an interior of a vehicle during a parking maneuver, and having a first signal property being adapted to a distance from a parking obstruction, convert the first signal into a second signal perceptible by an operator located outside the vehicle, and transmit the second signal, via a portable unit, to the operator during a remotely-controlled parking maneuver.

12. The vehicle parking system as claimed in claim 11, wherein the first property of the first signal is a frequency of the first signal.

13. The vehicle parking system as claimed in claim 11, wherein the controller is further configured to adapt a second property of the second signal to a prevailing distance from the obstruction, wherein the second property of the second signal is a frequency of the second signal.

14. The vehicle parking system as claimed in claim 11, wherein the first or second signal is transmitted as a haptic signal.

15. The vehicle parking system as claimed in claim 11, wherein the first signal is an acoustic signal and the second signal is a visible signal.

16. A vehicle comprising:
    a parking system configured to perform a remotely-controlled maneuver; and
    a controller configured to, in response to an acoustic signal generated by a vehicle parking aid within a vehicle interior and having a first property varying in response to a vehicle distance from an obstruction, convert the acoustic signal into a visible signal perceptible by an operator located outside the vehicle during the maneuver.

17. The vehicle as claimed in claim 16, wherein the controller is configured to vary a property of the second signal responsive to a prevailing vehicle distance from the obstruction.

18. The vehicle as claimed in claim 17, wherein the property of the second signal is a frequency of the second signal.

19. The vehicle as claimed in claim 16, wherein the first property of the first signal is a frequency of the first signal.

20. The vehicle as claimed in claim 16, wherein the controller is further configured to, in response to a predetermined operator action, cause, via the parking system, an immediate vehicle stop.

* * * * *